(12) United States Patent
Conus

(10) Patent No.: US 12,026,289 B2
(45) Date of Patent: Jul. 2, 2024

(54) SECURE SOFTWARE-DEFINED RADIO CHIP

(71) Applicant: NAGRAVISION SÀRL, Cheseaux-sur-Lausanne (CH)

(72) Inventor: Joël M. Conus, Cheseaux-sur-Lausanne (CH)

(73) Assignee: NAGRAVISION SÀRL, Cheseaux-sur-Lausanne (CH)

( * ) Notice: Subject to any disclaimer, the term of this patent is extended or adjusted under 35 U.S.C. 154(b) by 581 days.

(21) Appl. No.: 16/956,618

(22) PCT Filed: Nov. 28, 2018

(86) PCT No.: PCT/EP2018/082780
§ 371 (c)(1),
(2) Date: Jun. 22, 2020

(87) PCT Pub. No.: WO2019/120908
PCT Pub. Date: Jun. 27, 2019

(65) Prior Publication Data
US 2020/0401730 A1   Dec. 24, 2020

(30) Foreign Application Priority Data

Dec. 22, 2017   (EP) ..................................... 17210095

(51) Int. Cl.
*G06F 21/72*   (2013.01)
*G06F 9/445*   (2018.01)
(Continued)

(52) U.S. Cl.
CPC .......... *G06F 21/72* (2013.01); *G06F 9/44505* (2013.01); *G06F 21/57* (2013.01);
(Continued)

(58) Field of Classification Search
CPC ...... G06F 21/72; G06F 9/44505; G06F 21/57; G06F 21/76; G06F 2221/033;
(Continued)

(56) References Cited

U.S. PATENT DOCUMENTS

2003/0099358 A1\* 5/2003 Michael .................. H04L 63/12
713/168
2003/0215089 A1   11/2003 Mihaljevic et al.
(Continued)

FOREIGN PATENT DOCUMENTS

JP   2003 304235 A   10/2003
WO   97 08839 A   3/1997

OTHER PUBLICATIONS

Broadcom BCM21551 Product Brief, Jun. 12, 2007, XP055830741, Retrieved from the Internet on Aug. 6, 2021—URL: https://pdf.dzsc.com/88888/200812194115713.pdf.
(Continued)

*Primary Examiner* — Michael J Brown
(74) *Attorney, Agent, or Firm* — Maier & Maier, PLLC

(57) ABSTRACT

The present invention relates to a software-defined radio chip or module suitable for integration on a host device. The software-defined radio chip comprises digital signal processing capability which includes standard digital signal processing hardware and reconfigurable programmable logic, the reconfigurable programmable logic is configured in such a way as to provide secure digital signal processing capability to the software-defined radio, thereby providing a secure software-defined radio.

19 Claims, 5 Drawing Sheets

(51) Int. Cl.
  *G06F 21/57*   (2013.01)
  *G06F 21/76*   (2013.01)
  *H04B 1/00*    (2006.01)
  *G06F 9/44*        (2018.01)
  *H04W 12/10*       (2021.01)

(52) U.S. Cl.
  CPC ........... *G06F 21/76* (2013.01); *H04B 1/0014* (2013.01); *G06F 2221/033* (2013.01)

(58) Field of Classification Search
  CPC ... H04B 1/0014; H04B 1/0003; H04L 63/123; H04L 63/0435; H04W 12/10; H04W 12/35
  USPC .................................................. 713/1, 2, 100
  See application file for complete search history.

(56)  References Cited

U.S. PATENT DOCUMENTS

2006/0015674 A1\* 1/2006 Murotake .............. H04B 1/406
                                                    711/101
2010/0146274 A1   6/2010 Naslund et al.

OTHER PUBLICATIONS

Office Action issued on Apr. 9, 2024, in corresponding Korean Application No. 10-2023-7024036, 14 pages.

\* cited by examiner

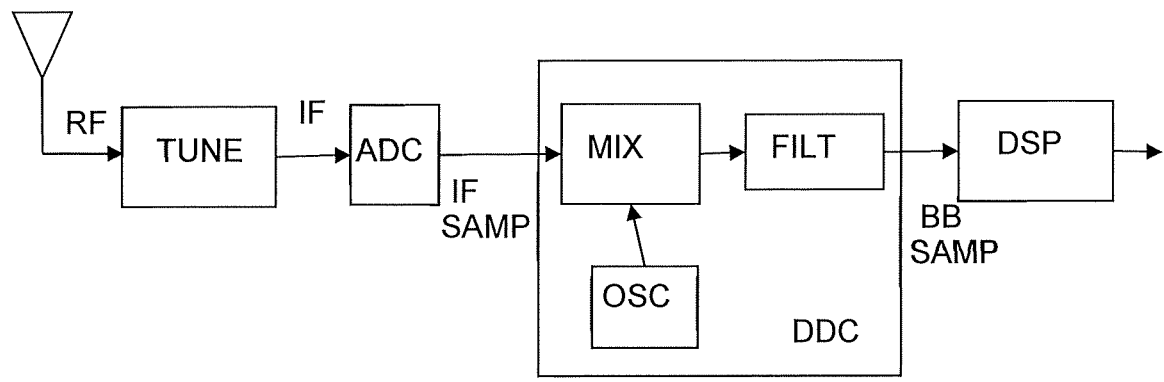
Figure 1: PRIOR ART
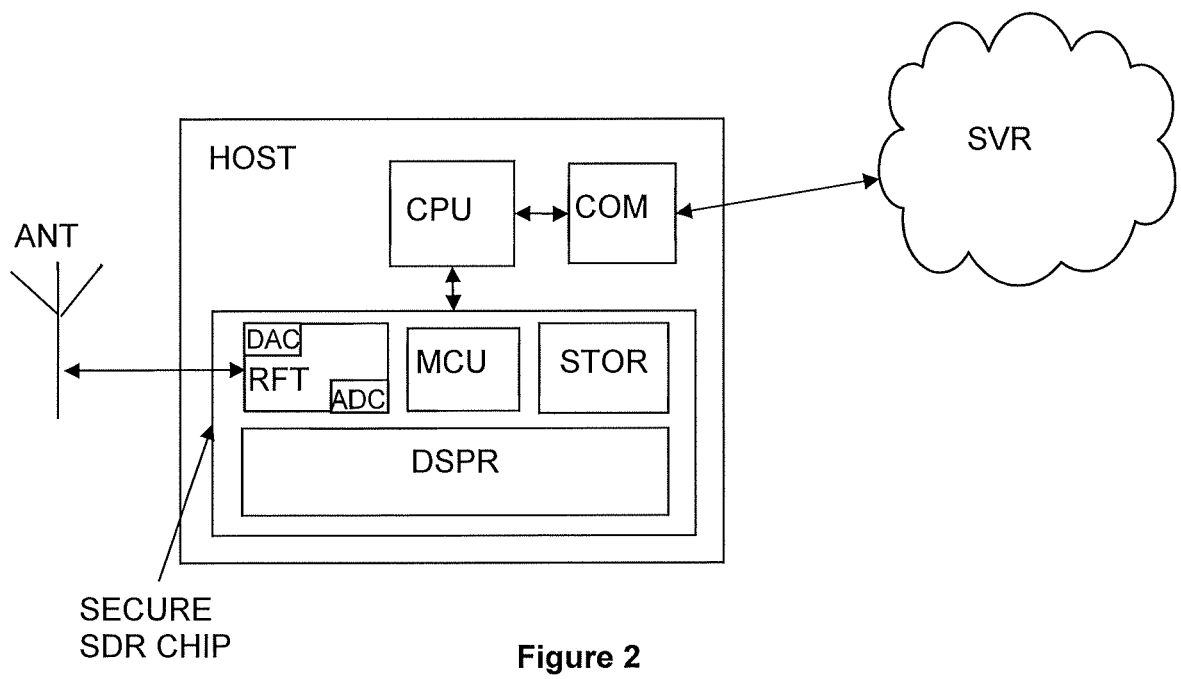
Figure 2

SECURE SOFTWARE-DEFINED RADIO CHIP

INTRODUCTION

The present disclosure relates to secure processing, particularly in the domain of radio signal processing.

BACKGROUND

With the advent of digital processors becoming ever more powerful, components for radio communications systems, such as mixers, filters, amplifiers and the like, which were traditionally implemented in hardware, may now be implemented by means of software. It is therefore possible to build a software-defined radio "SDR" on a digital processor or in an embedded system.

Advantages of SDR over traditional hardware-based radios are afforded by the ability to design a radio using general purpose processors, application specific integrated circuits ASIC or in hardware programmable logic devices such as field programmable gate array devices FPGA, for example, to implement the necessary digital signal processing algorithms such as radio signal generation, coding and modulation. In this manner, reception and transmission of wideband radio signals according to a wide variation of radio protocols may be readily implemented while maintaining great flexibility due to the ability to modify the software to cover the different requirements regarding radio protocols, bandwidths and user preferences or operating environment characteristic as required. FPGAs provide even more flexibility than ASICs because they are re-configurable even after their deployment in the field. ASICs are generally used when the radio parameters are not expected to change over time. In known SDRs, a significant number of blocks in the transmit and/or receive paths have their functionality defined by software, making the functions easily alterable by programming. SDRs therefore are finding use in the domain of mobile communications, where it is required to quickly adapt a handset's capabilities, including its radio frequencies, protocols or operating environment variables. Changes to such features may be made on-the-fly using over-the-air updating.

Currently available programmable logic devices such as ASICs and reconfigurable hardware programmable logic device such as FPGAs are not known for their high security characteristics and indeed, all provide only the very basic of security features. Consequently, there is a need for a hardware programmable chip which will allow for a secure SDR to be implemented.

BRIEF DESCRIPTION OF THE DRAWINGS

The present inventive concepts will be better understood thanks to the detailed description which follows and the accompanying drawings, which are given as non-limiting examples of embodiments of the inventive concepts, namely:

FIG. 1, showing a schematic diagram of a known software-defined radio system;

FIG. 2, representing an embodiment of a secure software-defined radio chip embedded in a host device as described herein;

DETAILED DESCRIPTION

Figure 3:
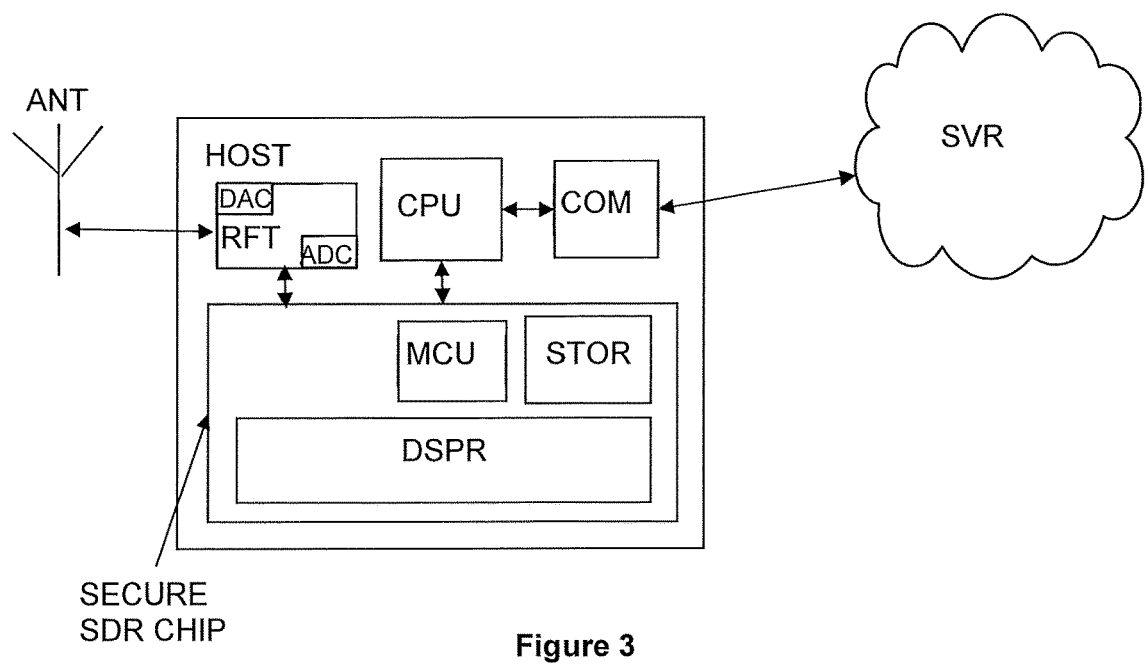
FIG. 3, illustrating an alternative embodiment described herein.

According to a first aspect, in order to address the security issues, among others, in the implementation of software-defined radio, embodiments disclosed herein provide for secure radio processing means using a software-defined radio chip having a secure cryptographic device. According to an embodiment a root of trust is created in the cryptographic device and a key ladder is used in order to ensure that any software loaded to the software-defined radio chip is authenticated. According to other embodiments, any of the data and/or instructions, rules or commands entering and/or leaving the secure software-defined radio chip may be authenticated.

According to another aspect, there is provided a method for programming a software-defined radio chip comprising a reconfigurable hardware programmable logic circuit, the software-defined radio chip comprising a root of trust, the method comprising:

loading information onto the reconfigurable hardware programmable logic circuit after authenticating and decrypting the information using a key as part of a key ladder derived from particular key of the root of trust.

According to an embodiment, the method described above may further comprise signing at least a portion of any of the information leaving the reconfigurable hardware programmable logic circuit. It will be well understood that any RF data that has been captured and sent to a server, may also be encrypted.

FIG. 1 is a schematic diagram showing a known software-defined radio system. The selected TUNE radio frequency input signal RF is shifted to provide an analogue intermediate frequency signal IF. The IF signal is then converted from the analogue domain to the digital domain using an A/D converter ADC, thereby providing digital IF samples IF SAMP. In order to facilitate subsequent processing, digital IF samples are generally represented in the form of I/Q data, since this is a convenient format for performing the various required processing operations in software using a hardware programmable device. As shown in FIG. 1, various functions, which would have been performed in hardware, are now performed in software in the SDR system. These functions together may be described as digital down-converting DDC, which serves to provide digital baseband samples BB SAMP. Such functions, implemented in software and executed on programmable hardware devices in the SDR, are shown in FIG. 1 and include digital mixing of signals MIX with the aid of a digital local oscillator OSC, and low-pass filtering FILT. General digital signal processing functions DSP may then be performed on the digital baseband samples BB SAMP.

An embodiment of a secure software-defined radio chip is shown in FIG. 2. The embodiment could be a standalone chip or it could be a module or a unit which can be used within a bigger chip including the software-defined radio unit as well as other units or modules to perform different functions as part of a larger system on a chip. For example, in FIG. 3, instead of the secure SDR chip being an actual chip, it could be a unit which could be included in the same physical chip as the CPU. Throughout the present document, the term software-defined radio chip can also be taken to mean a software-defined radio unit or a piece of hardware IP. The secure SDR chip is shown embedded in a host device. According to the embodiment, a self-contained secure chip is provided, which includes all of the analogue and digital blocks, the analogue part including the radio frequency transceiver RFT along with any required signal conversion units such as an analogue to digital converter ADC, and the digital part including the microcontroller unit MCU, storage area STOR for the secure SDR chip and digital signal processing capability including at least a reconfigurable hardware programmable logic circuit RHPC. According to one variation, any general DSP functions which may be required may be performed within the reconfigurable hardware programmable logic circuit. According to another variation, the general DSP functions may be performed on a suitably configured DSP module, thereby providing an advantage of faster processing speed and reduced cost since the DSP is a standard module. Conversely, the DSP functions being performed in the programmable hardware device allows for the DSP functions to be re-programmable and so more flexible. The RHPC or the combination of RHPC and DSP of FIG. 2, depending on the variation in question, may be referred to as a digital signal processor for performing SDR functions DSPR. In one embodiment, secure functions may be carried out within the DSPR. In another embodiment, secure functions may be performed by the microcontroller unit. In the first variation, the RHPC part would deal with the digital down-conversion of the IF samples to provide baseband samples and the band processing steps of the SDR chip. In the second variation, the RHPC part would deal only with the digital down-conversion of the IF samples to provide baseband samples and a DSP would be included to deal with the base-band processing steps of the SDR chip. Digital down-conversion may include mixing and filtering, the mixing using a local oscillator. The host device comprises the secure SDR chip, a main processing unit CPU and a communications interface COM for communicating with a server such as a cloud server. The various components of the secure SDR chip will be described below. The microcontroller unit MCU is preferably a secure microcontroller unit in order to ensure the security of the secure SDR chip as a whole. Such security may be provided, for example, by performing key management functions, cryptographic operations etc. The secure microcontroller controls or otherwise drives the various radio components. Decisions such as which radio frequency to tune to, how much bandwidth needs to be received/sent, how to modulate/demodulate signals, how to deal with the received data, etc., may be taken by the MCU. The MCU may also handle secure communications with the host device and/or a cloud server via the communications interface COM.

The storage unit STOR serves as a storage area, local to the secure SDR chip, for data or meta-data extracted from the radio signal. Wideband signals generally require a significant amount of space to be stored and so the secure SDR chip should preferably have local storage means. The storage may be in the form of an I/O buffer, preferably implemented as random access memory RAM since high speed operation is generally required. Where long term storage is required, it is preferable to use a non-volatile type of memory as a storage unit, typically the case when storage of meta-data or analytics rules is required.

The radio frequency transceiver RFT is the main analog part of the SDR. The radio frequency transceiver receives, and may transmit, radio signals and may use an analogue to digital converter ADC in order to allow analogue radio frequency signals received via the antenna to be useable in the digital domain of the MCU and the secure software defined radio chip's radio digital signal processor. The radio frequency transceiver may also use a digital to analogue converter DAC to convert signals from the digital domain back to the analogue domain for transmission via the antenna. The antenna used by the radio frequency transceiver RFT preferably matches the required frequencies. While decent reception could be achieved using a wideband antenna, transmitting requires a specific antenna or specific antennae in order to maintain a low standing wave ratio SWR. If the SDR is designed to work with signals having high enough frequencies, such as in the ultra-high frequency range UHF including those frequencies ranging between UHF 300 MHz and 3 GHz or in the super-high frequency range SHF including those frequencies ranging between 3 GHz and 30 GHz, then it may be possible to embed the corresponding antenna on a printed circuit board PCB on which the host device is deployed.

Digital processing capability for the secure SDR chip is provided by the block named DSPR in FIG. 2. DSPR may include a standard digital signal processor DSP for performing standard DSP functions plus a reconfigurable hardware programmable logic circuit RHPC, such as an FPGA, to provide digital signal processing functions which are programmable in order to at least provide the necessary flexibility in the DSPR. The RHPC contributes towards the required flexibility to be achieved, where the radio has to be able to work at different radio frequencies and for different radio protocols, or according to different user preferences or operating environment conditions. Thus, the functions of the radio are easily alterable by software re-programming to reconfigure the programmable logic circuitry. Such altering of the functions may also include software programming to programme the DSP. It will also be shown that the reconfigurable hardware programmable logic circuit, according to embodiments described herein, contributes towards the overall security of the secure software-defined radio chip. The DSPR unit may be considered to be the processor of the SDR. The DSPR may be described as a combination of a standard DSP and the reconfigurable hardware programmable logic circuit RHPC. The firmware for this processor may be loaded by the MCU. The firmware may be modified depending on the target application. The DSP may be said to be the software programmable part of the software-defined radio chip's processor, while the reconfigurable hardware programmable logic circuit may be said to be the hardware programmable part of the processor.

According to an embodiment, the reconfigurable hardware programmable logic circuit includes logic required for processing the I/Q digital IF samples coming from and going to the radio frequency transceiver. This part of the processing represents the intensive processing that would normally not be possible by a standard microcontroller. Such processing includes functions like modulation, demodulation, digital down conversion, fast Fourier transforms FFT, radio signal detection, etc.

According to another embodiment, the analogue radio components, such as the RF transceiver and the analogue to digital and digital to analogue converters, may remain outside of the secure SDR chip. This is illustrated in FIG. 3. Cost advantages are realisable by doing this because chip size, or module size, can be reduced. Further advantages are to be realised since different design options can be exploited when the analogue components do not have to be on the same chip, or module, as the digital processing functions. This embodiment has a limited impact on the security of the system because the main components of the system remain within the secure zone. The main drawbacks from this approach are that it is conceivable that an attacker could discover which frequencies are being tuned to, thus allowing him or her to get the I/Q data being received over the RF. This is known as an intelligence leak. As mentioned above, according to an embodiment, the secure SDR "chip" may not be an actual chip but may be an IP unit included within the CPU for example.

According to embodiments described herein, the secure SDR chip may be used to pre-analyse a chunk of an incoming RF spectrum. Pre-analysing an incoming signal or spectrum may be described as extracting specific data and collecting certain meta-data from the incoming RF signal. Pre-analysing the incoming signal is preferred because sending the complete I/Q data representative of the incoming signal to a server for remote analysis of the signal would involve transmitting a large amount of data, thus requiring large amounts of network bandwidth. This remains true even after digital down-conversion of the signal. Consequently, according to embodiments, the RF data is demodulated locally, within the re-configurable logic circuit DSPR, and processed at least to extract certain specific data related to the signal and to collect certain meta-data related to the signal. These are the results of the pre-analysis. The results of the pre-analysis are then sent to the server for further processing. In this manner the amount of bandwidth required is significantly reduced.

Consumable output of a secure software-defined radio as described herein may be a signal which allows a user to consume content. For example, according to an embodiment, the consumable content is an audio signal representative of a radio show. Similarly, a consumable output may be a video signal or an audio/video signal. Other examples of consumable output include wireless signals according to protocols such as WiFi, LTE, Bluetooth, etc.

According to embodiments, the server may send the protocol specification or reference and/or the required modulation and other associated data to the secure SDR chip in order that the secure SDR chip may then package the pre-analysis results according to the required protocol and the required modulation as well as performing the digital up-conversion as necessary. According to a variation, instead of packaging the pre-analysis results as described above, the SDR chip may package the pre-analysis processing rules. The actual pre-analysis results or parameters are generally considered to be proprietary information and as such, have business value, and so it may be desirable not to expose this information to potential theft. This is one of the motivations for keeping SDR processing and data analytics processing secure. It is also worth noting that data or meta-data extracted from radio signals may simply be required to be kept private even if there were no business value, and so secure processing is again a desirable feature.

In use, embodiments of a secure SDR chip described herein provide, among others, the following benefits:
  mutual authentication between the secure chip and the server;
  confidentiality and integrity of the data and/or meta-data that transits between the secure chip and the server;
  confidentiality of the processing rules, including DSP functions, to which the secure chip is required to perform;
  the main CPU of the host, which cannot be fully trusted, never gets access to the data or meta-data;

In order to provide end-to-end security, it is desirable for the server also to feature hardware security, especially if the network is not leak-proof. A leak-proof network, otherwise known as an air-gapped network, would be one which does not include the internet, for example. It is also worth noting that although the main CPU cannot generally be fully trusted, in certain cases the main CPU may still be allowed to perform certain RF operations which do not compromise security.

Embodiments of a secure software-defined radio IP unit or chip include a digital front-end for converting digital intermediate frequency sample to digital baseband samples, and a digital back end for processing the digital baseband samples to provide consumable content. Some embodiments may also include an analogue front end at least for converting radio frequency signals to an analogue intermediate frequency signal and then to convert the analogue intermediate signal to provide the digital intermediate frequency signals mentioned above. The software-defined radio chip also includes a reconfigurable hardware programmable logic circuit. According to one embodiment, the reconfigurable hardware programmable logic circuit is configured to provide the functionality of the digital front end and of the digital back end. According to another embodiment, the software-defined radio chip further comprises a DSP adapted to efficiently perform digital signal common processing functions. In this case the reconfigurable hardware programmable logic circuit may be configured to convert the digital intermediate frequency signals to digital baseband samples, with the DSP being configured to process the digital baseband signals. According to the embodiments, the reconfigurable hardware programmable logic circuit comprises a secure cryptographic device. According to different embodiments, the secure cryptographic device may be realised in the digital front end and/or the digital back end.

Secure cryptographic devices deployed as part of embodiments described herein, may be based on a root of trust, preferably a hardware root of trust. According to an embodiment, a root of trust and a key ladder may be used in combination. A root of trust may be created by generating a particular key, for example during manufacturing of the secure software-defined radio unit, and securely storing the particular key in the unit. A convenient place for this may be the storage unit for example, as long as it is stored in a secure manner. Ideally, the root key may be stored in a one-time programmable memory OTP. This key may be referred to as a root key. Alternatively, in order to avoid having to load or otherwise initialise a key at personalization time, the root key may be generated using a physically un-clonable function PUF. PUF and OTP both provide a good guarantee that the root key cannot be altered.

The root key may be used to generate other keys of the key ladder using a key derivation function or algorithm, for example. Other keys may be, for example, a key for validating or otherwise authenticating configuration data, analysis parameters or processing rules, or signature keys, preferably as part of a private-public key pair of an asymmetric encryption scheme. Thus, it is possible to perform a one-way function, such as a hash function, on the content or parts of the content of the reconfigurable hardware programmable logic circuit. Furthermore, it is possible to get a signed hash. Consequently, it is possible for the server in a system such as that shown in FIG. 2 or 3, to authenticate the secure software-defined radio chip and vice versa. Indeed, any of the modules may authenticate any of the communications within the system. Thanks to the root of trust, software being loaded to the reconfigurable hardware programmable logic circuit may be authenticated, rules, commands, instructions and data going in and out of the chip may be authenticated, preferably by verifying signatures. The following is a description of a particular example of how to implement a flexible, or otherwise programmable, cryptographic device with associated configuration logic, which may be deployed in a DSPR according to an embodiment described herein. Any of the techniques and methods described here may be used in order to realise a secure reconfigurable hardware programmable logic circuit for a secure SDR chip, whose functionality is reprogrammable after its manufacture, for use in any of the embodiments described above. For example, the reconfigurable hardware programmable part of the RHPC/DSP combination used as a secure software-defined radio signal processor DSPR, in addition to being reprogrammable in order to provide flexible radio processing characteristics described above, may also be programmable to provide the security to the chip. Such techniques for programming the reconfigurable hardware programmable logic circuit to provide security are described below.

According to aspects of an embodiment, a method of programming a reconfigurable programmable device is provided, comprising: acquiring configuration data, loading the configuration data onto the programmable device, processing at least a portion of the configuration data through a one-way function to form or generate processed configuration data and configuring at least one configurable module of the programmable device using the processed configuration data from the processing step. This allows post-manufacture programming of the at least one configurable module in a secure manner, and hence design and fabrication of the programmable device is simplified and less costly whilst maintaining security. In some embodiments, the one-way function comprises a hash function which may be a cryptographic hash function.

In some embodiments, the loading step further comprises decrypting the configuration data, and optionally, the loading step further comprises verifying the authenticity and/or integrity of the configuration data by way of an asymmetric key or a symmetric key. This provides security of the configuration data in the sense that the configuration data may be kept confidential and/or its authenticity and integrity may be verified.

In some embodiments, the loading step comprises loading the configuration data onto a configuration module of the programmable device. The decryption and/or the verification may be carried out by the configuration module.

In some embodiments, the configuring step comprises a least one of initialising the programmable device, configuring a configurable module of the programmable device, and configuring an interconnection between modules of the programmable device wherein the modules may be configurable or non-configurable.

In some aspects, a programmable device is arranged to carry out any of the methods as described herein. The programmable device may comprise a one-way function and at least one configurable module. The one-way function may comprise a hash function which may be a cryptographic hash function. In some embodiments, the programmable device comprises a configuration module and/or a processing module. The programmable device may comprise an FPGA, PLD, CPLD or an anti-fuse device, for example.

In some embodiments, the at least one configurable module comprises a cryptographic module. In some embodiments, the cryptographic module comprises at least one of a substitution box module, a substitution table module, a bit permutation module, a byte permutation module, or a matrix multiplication module. In some embodiments, the cryptographic module comprises a hardener for a true random number generator or a physically un-cloneable function, 'PUF'. In some embodiments, the at least one configurable module comprises a programmable state-machine. The programmable device may comprise a secure element. The programmable device may be deployed within a smartcard and/or within a set-top box, radio device or other device for providing consumable content.

In some embodiments, the power consumption while executing the method adheres to smartcard operating parameters and/or the form factor of the programmable device adheres to smartcard parameters. In some embodiments, any configurable module in the programmable device may be configurable by the method.

Figure 4:
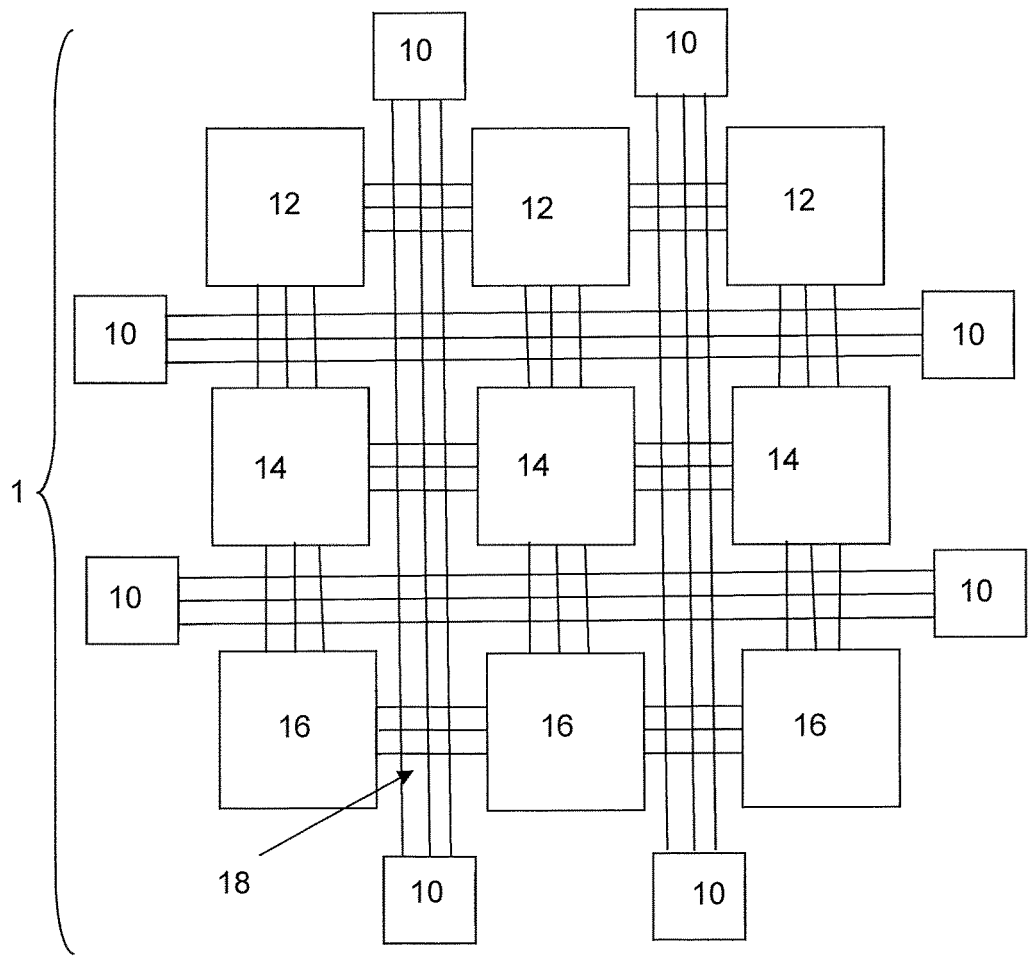
FIG. 4, showing a reconfigurable hardware programmable logic circuit comprising cryptographic modules.

FIG. 4 illustrates a programmable device 1. Examples of programmable devices include FPGA, PLD, CPLD and anti-fuse devices among others, and may also be referred to as reconfigurable hardware programmable logic circuits. The reconfigurable hardware programmable logic circuit of FIG. 4 comprises at least one input/output module, or IO module, 10 for providing inputs and outputs to the other modules of the reconfigurable hardware programmable logic circuit, and one or more cryptographic modules comprising one or more of a substitution box/substitution list module 12, a bit/byte permutation module 14 and a matrix multiplication module 16 as would be understood by the skilled person. An interconnection network 18 as shown by the vertical and horizontal lines passes between modules of the reconfigurable hardware programmable logic circuit. As would be understood, FIG. 4 is an example. Any combination of IO modules 10, other modules 12, 14, 16, and interconnection network could be deployed.

Figure 5:
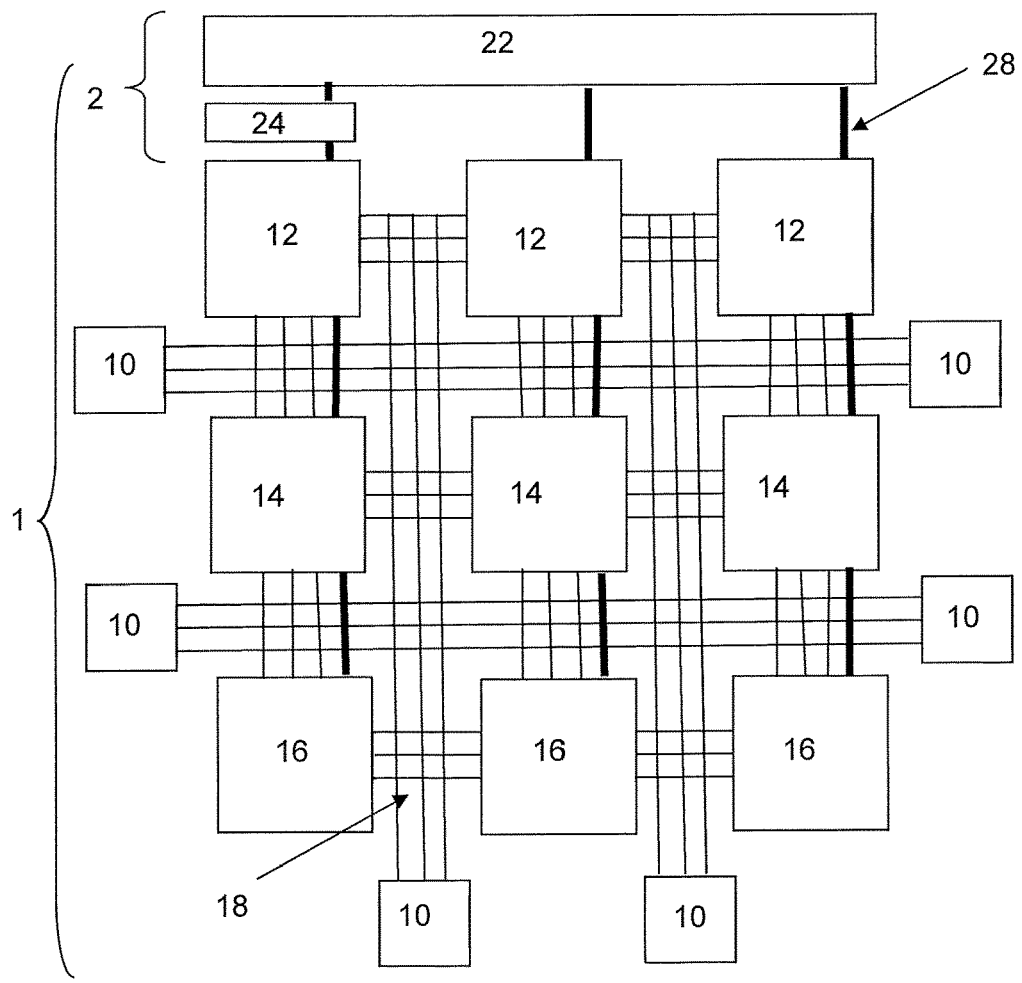
FIG. 5, illustrating a reconfigurable hardware programmable logic circuit which may be deployed in an embodiment.

Turning to FIG. 5, it can be seen that at least one of the IO modules 10 as shown in FIG. 4 may comprise a decrypt and verify module 22 and a processing module 24 which both may be considered to be part of a configuration module 2. Modules 22 and 24 may be part of the same physical module on the reconfigurable hardware programmable logic circuit 1. As also shown in FIG. 5, interconnection network 18 passes between modules of the reconfigurable hardware programmable logic circuit. At least one of the modules 10, 12, 14, 16, and/or at least a subset 28 of any of the interconnection network 18 as shown by the thicker lines, by way of example, may be configured using configuration module 2. Any of the modules of the reconfigurable hardware programmable logic circuit are capable of being configured by way of the configuration module 2. Hence, the programmable device 1 may be considered to comprise a flexible cryptographic device. According to a variation, the decrypt and verify module and processing module described above may be included as part of the MCU of the secure SDR chip, especially where the MCU is a secure MCU, and so would not necessarily need to be included within the reconfigurable hardware programmable logic circuit.

Figure 6:
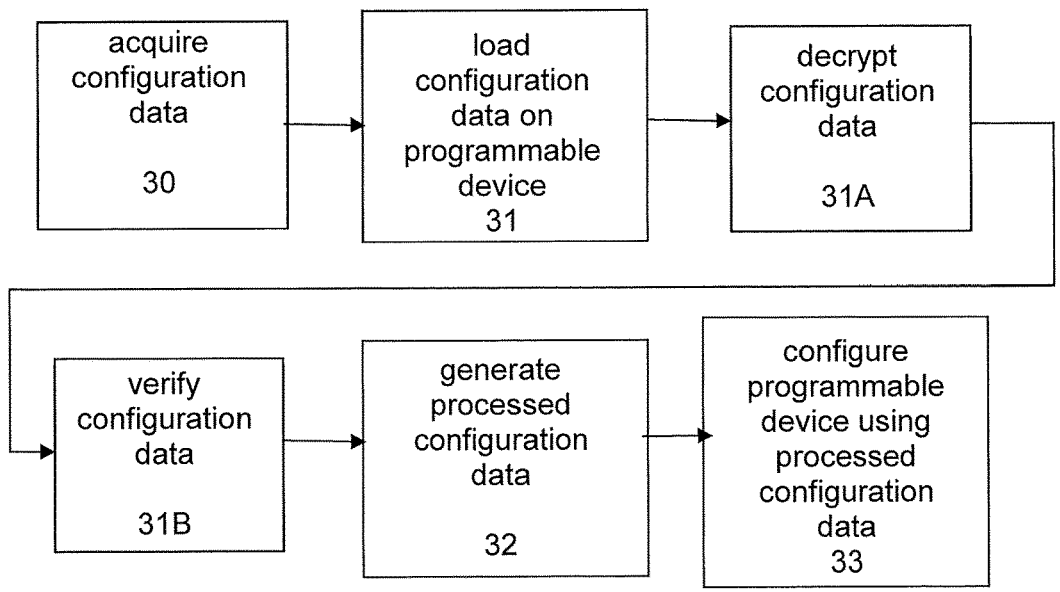
FIG. 6, illustrating a method which may be used in an embodiment.

With reference to FIG. 6, a method will now be described in which at least one module of the reconfigurable hardware programmable logic circuit 1 may be configured in a secure manner. In a first step 30, configuration data is acquired, and then loaded 31 onto the reconfigurable hardware programmable logic circuit 1 by way of any suitable means available on the reconfigurable hardware programmable logic circuit 1 in question. After loading, the configuration data may reside on a configuration module 2 of device 1. In particular the configuration data may reside in a decrypt and verify module 22. The configuration data may be decrypted 31A by module 22. The authenticity and/or integrity of the configuration data may be verified 31B by module 22 by way of at least one asymmetric or symmetric key or a combination thereof as would be understood. Verification may occur before or after decryption. Authenticity of data is ensured when the data is proven to be from a trusted source. Integrity of data is ensured when it can be proven that the data has neither been modified nor corrupted. After the optional decryption and verifying, at least a portion of the configuration data is then processed in step 32 by processing module 24 to generate processed configuration data. Processing module 24 comprises a one-way function that is operable on the configuration data to provide the processed configuration data. The one-way function is a function whereby it is straight forward to compute the output given the input, but given an output, it is difficult to compute the input. That is to say that it is difficult to compute the inverse function of the one-way function, and preferably, the inverse function cannot be computed.

Processing step 32 may be carried out before or after any decryption and/or verification of steps 31A and 31B.

At step 33, at least one configurable module 10, 12, 14, 16 of reconfigurable hardware programmable logic circuit 1 is configured using the processed configuration data. The configurable module may comprise a cryptographic module such as at least one of a substitution box module, a substitution table module, a bit permutation module, a byte permutation module, or a matrix multiplication module. The configurable module may also comprise a hardener for a true random number generator or a physically un-clonable function, 'PUF' and/or a flexible state-machine, or any portion of the interconnection network—see 28 of FIG. 5.

Configuring by way of the processed configuration data may comprise at least one of:
  initialising the reconfigurable hardware programmable logic circuit 1, whereby internal building blocks, for example flip-flops, of one or more configurable modules of the reconfigurable hardware programmable logic circuit 1 are initialised.
  configuring a configurable module of the reconfigurable hardware programmable logic circuit, for example configuration of cryptographic modules such as substitution boxes, bit permutations, or flexible state-machines, or arithmetic operations such as matrix multiplication, multiply or addition, and/or other modules such as linear feedback shift registers.
  configuring an interconnection between modules of the reconfigurable hardware programmable logic circuit. The interconnection between configurable or non-configurable modules of the reconfigurable hardware programmable logic circuit 1 may be configured. This may include making, breaking or joining interconnections between any of the modules of the reconfigurable hardware programmable logic circuit 1.

Additionally, or alternatively, configuring may comprise generating elements by the one way function such as a constant value impacting the behaviour of a configurable module such as a cryptographic module by acting as segmentation elements, initialization vectors, pseudo-random permutations, static keys for example. The output of the one way function may also be combined with other configuration elements that are chosen such that the resulting output matches an expected value.

Some modules of the reconfigurable hardware programmable logic circuit 1 may be configured by way of configuration data that has not been processed by processing module 24.

Figure 7:
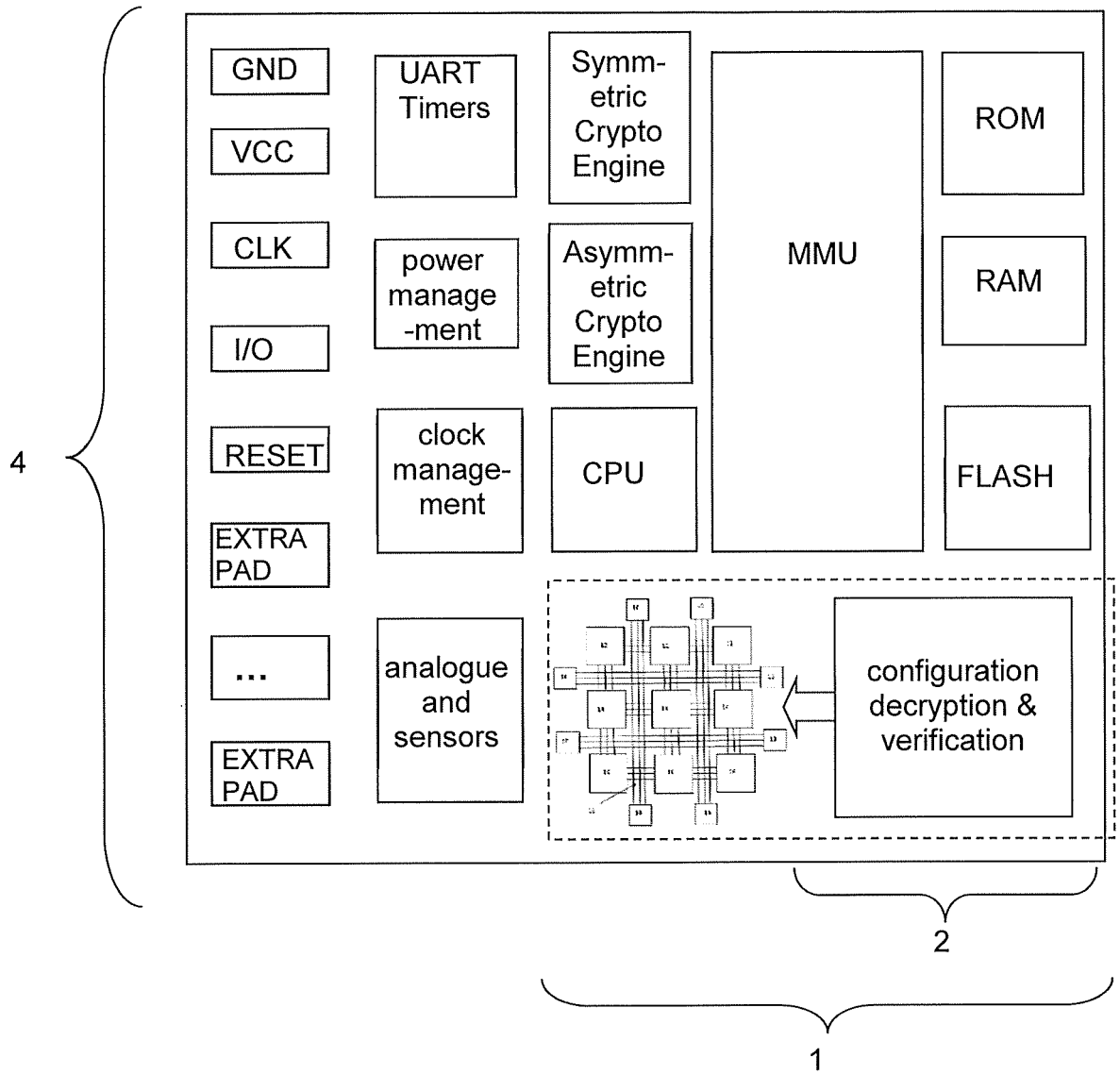
FIG. 7, illustrating a programmable device comprising cryptographic modules.

After step 33, the reconfigurable hardware programmable logic circuit 1 is securely configured. To put the above concept in context, looking at FIG. 7, FIG. 7 illustrates a reconfigurable hardware programmable logic circuit 1 positioned within a smartcard device 4. As would be understood, various components of a smartcard are shown in FIG. 7. On the left hand side of the figure are shown the input/output pads, including ground, Vcc, clock, I/O data and extra pads, while various functional components 15 are shown as being present for illustrative purposes only. A memory management unit MMU is shown for interaction with the various onboard memories such as ROM, which is a one-time programmable ROM such as an effuse ROM, RAM and Flash EEPROM, as would be understood. The other modules are not described herein as their function would be known to the skilled person. A subset of the illustrated functional blocks may be present in further examples. Reconfigurable hardware programmable logic circuit 1 may be considered to be a secure element. The power consumption while executing the method as described herein may adhere to smartcard operating parameters, and/or the form factor of the reconfigurable hardware programmable logic circuit may adhere to the smartcard parameter standard.

Hence, a smartcard 4 comprising the flexible cryptographic device as described herein and as illustrated in FIG. 7 is capable of bespoke and adaptable radio signal processing, if, for example, the smartcard resides in a software defined radio chip or IP unit. Further, flexible cryptographic functionality can be provided to internet-of-things devices or system on-chip, SOC embedded devices.

The configurable modules and/or configurable interconnections of reconfigurable hardware programmable logic circuit 1, after undergoing the method described herein, can be tailored for individual vendor needs without undergoing a hardware re-design of the silicon.

Accordingly, a method of deploying a secure module, for example a secure element of a reconfigurable programmable logic circuit is provided. By allowing aspects of the secure module to be programmed post-manufacture, the design and fabrication of the secure module, and hence the device within which it resides is simplified and hence less costly. The post-manufacture programming 15 capability allows aspects of the cryptographic scheme employed by the secure module to be deployed at or before the time of activation of the device containing the secure module. This reduces the burden on bespoke design of silicon such as secure elements which can reduce time to market as well as allowing segmentation of design and security features between different implementations. Further, by holding back some aspects of the design to the implementation stage, a design level attack would not result in knowing all information required to implement the secure element.

This allows flexibility both in design and manufacture of the secure module in that new devices/PCBs comprising a secure element can be distributed that are of a more generic design allowing reduction in manufacturing cost.

As a result, controlled, or conditional access, content providers can take advantage by way of the fact they may:
  1. tailor their access control algorithms/keys/codes at will at the point of distribution of the device containing the flexible cryptographic device such as a secure element for example; and/or 2. change aspects of the secure access control by way of a download to devices post hardware distribution without needing to change hardware in the field. This allows the maintenance of secure access by way of changing secure data that may have become compromised by a successful attack.

In general terms then, security is therefore provided thanks to the secret key or other unique element embedded within the root of trust. Further, as would be understood, owing to the action of the one-way function, the configuration data cannot be regenerated in order to enable programming of a blank reconfigurable programmable logic circuit. Even if a desired state of the reconfigurable programmable logic circuit is obtained post-programming, for example by way of a microscopic attack or by scanning all pins of the reconfigurable programmable logic circuit or other device where the reconfigurable programmable logic circuit resides, with all possible input combinations, it is not possible to discover the configuration data required to achieve the particular configuration as the one-way function prevents this knowledge.

An embodiment of the reconfigurable hardware programmable device described herein may be deployed within a host device for providing consumable content from a received RF signal. By virtue of the possibilities for configuring the hardware to perform functions required in the digital front end of a software-defined radio chip, and by virtue of the reconfigurable hardware programmable device comprising a flexible cryptographic device, which can be said to be a secure element, a secure software-defined radio chip may thus be deployed in the host device. Security is also guaranteed when, for example, information is transmitted from the server over a given radio frequency through a given secure radio device. Thanks to the secure SDR chip, the integrity and the authenticity of this information can be guaranteed.

Figure 8:
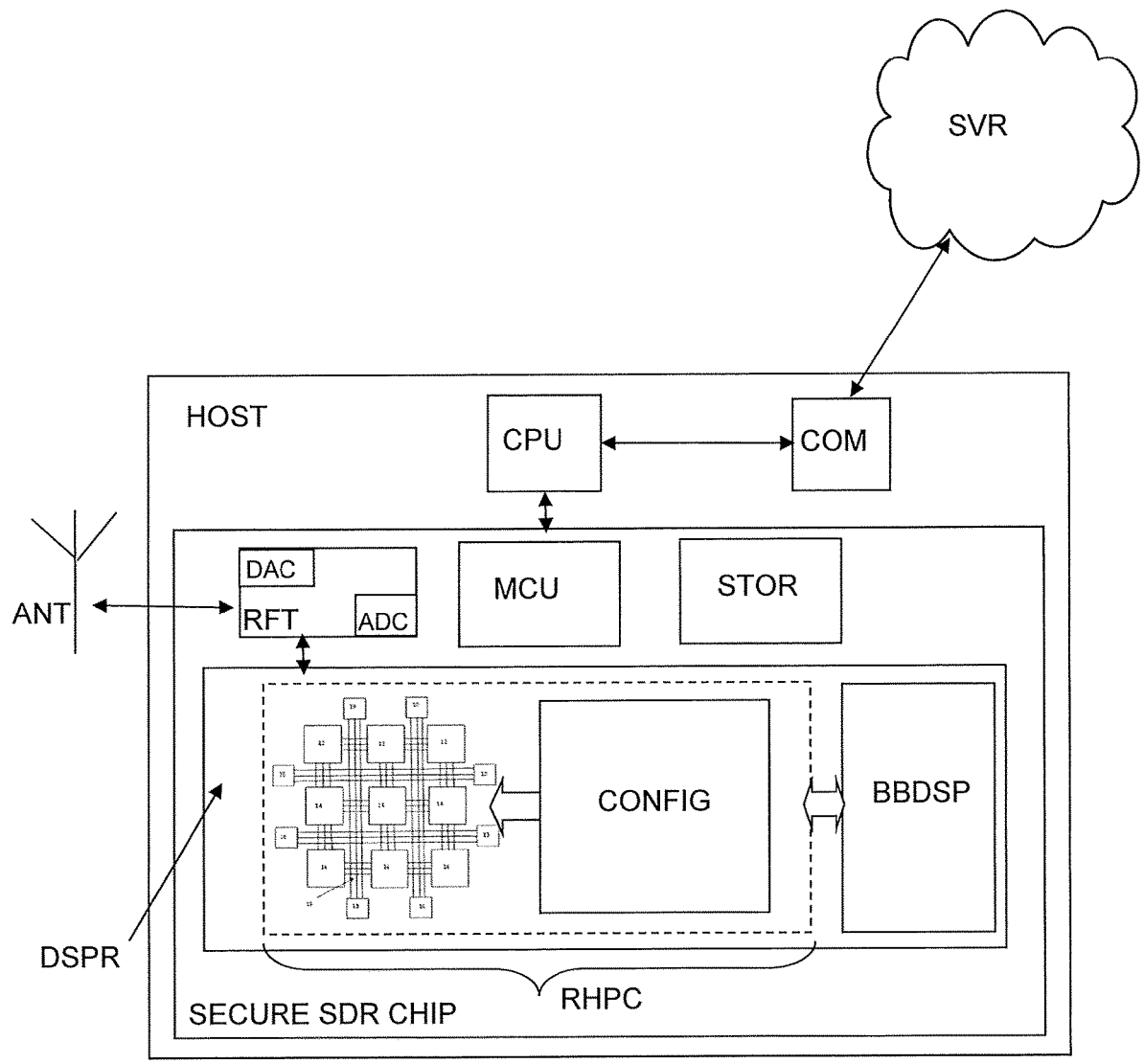
FIG. 8, showing more detail of the embodiment of a secure software-defined radio chip embedded in the host device illustrated in FIG. 2.

FIG. 8 shows an embodiment of a secure software-defined radio chip according to an embodiment, deployed in a host device. The host device may be a receiver for protected digital content, for example, comprising a main processor CPU and a communications interface for communicating with a server for example. The secure software-defined radio chip may include analogue hardware such as the radio frequency transceiver and any necessary analogue to digital and digital to analogue modules. According to an alternative embodiment, such analogue modules remain outside of the secure software-defined radio chip and are instead placed in the host device. In either of the embodiments, the secure SDR chip further comprises a microcontroller and some local storage, as described above with respect to FIG. 2. Furthermore, the secure SDR chip comprises a secure digital signal processing function, which may be seen to be a combination of a standard DSP block and a reconfigurable hardware programmable circuit RHPC. In a preferred embodiment the RHPC part would deal with the digital down-conversion of IF samples received from the transceiver's converted output to provide baseband samples and the DSP part would deal with the base-band processing secure steps of the SDR chip.

As described above, the RF signal received from the antenna of a software-defined radio chip has first to be translated to a baseband signal for baseband processing by the DSP. This translation may include the functions performed by the transceiver, including tuning and converting from RF to IF, analogue to digital conversion to provide IF samples and mixing and filtering to provide the baseband samples. The part of the radio which performs these functions may be known collectively as the front end. The front end may be made up of an analogue front end, including the transceiver functions and the analogue to digital conversion. The part of the radio which converts the IF samples to baseband samples may be referred to as the digital front end. One embodiment of the secure software-defined radio chip disclosed herein comprises an analogue front end, including the RF transceiver and analogue to digital converter, and a digital front end, comprising modules configured to provide mixing and filtering of intermediate frequency samples provided by the analogue front end and to deliver base-band samples for digital signal processing by the base-band processor DSP. According to another embodiment, the analogue front end is not included on the SDR chip, but instead is included in the host device. Preferably, for a radio configured to receive and process ultra-high frequency signals UHF in the range of 300 MHz to 3 GHz or super-high frequency signals SHF in the range of 3 GHz to 30 GHz, the antenna may be embedded on the same printed circuit board PCB as the host device. Consequently, according to an embodiment, a host device comprises an antenna for receiving RF input, a microprocessor, an interface module and a secure SDR chip comprising a microcontroller, local storage, an analogue front end and signal processing, including a digital front end in the form of a reconfigurable hardware programmable logic circuit and a baseband processor. According to another embodiment, a host device comprises an antenna for receiving RF input, a microprocessor, an interface module, an analogue front end and a secure SDR chip comprising a microcontroller, local storage, and signal processing, including a digital front end in the form of a reconfigurable hardware programmable logic circuit and a baseband processor.

The above description provides examples related to the reception path of a radio signal, where such signals are converted to IF, converted to the digital domain, mixed, filtered, among others, to provide baseband samples for further demodulation, decoding and/or analysis. It is worth noting, that embodiments described herein may equally comprise the signal chain for up-conversion of baseband samples to IF samples and the digital to analogue conversion to an IF signal then transmission of an RF signal by the transceiver. In some embodiments all of the processing of the digital domain radio signal mixing and filtering may be done by the reconfigurable hardware programmable logic circuit, while in other embodiments the processing by the reconfigurable hardware programmable logic circuit only goes up to the provision of the baseband samples, in which case the further baseband processing may be carried out by an off-the-shelf baseband processing module or DSP.

Embodiments described herein provide for:
confidentiality and integrity of the data/meta-data that are stored within the secure chip and that transit between the secure chip and the server;
confidentiality of the processing rules/algorithms performed by the secure chip;
the main CPU of the host never gets access to the data/meta-data as it cannot be fully trusted (although for certain applications it can be a feature to let the main CPU perform certain RF operations); and
mutual authentication between the secure chip and the server prevents unauthorized use of the SDR functionality.

For even higher end-to-end security, it is preferable that the server also includes hardware security features.

Benefits to end users include:
- a secure way to store and process radio spectrum analysis rules/algorithms locally in the device (these are highly valuable intellectual property);
- a secure way to store data, which may be required by regulation and helps protect the manufacturer's reputation (data leak prevention);
- a cloud service that securely retrieves radio data, stores it and analyzes it (tailored analytics);
- a secure cloud-to-RF service that allows sending any kind of radio transmission directly from the cloud; and
- a marketplace to sell or buy software radio data and meta-data.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described, but can be practiced with modification and alteration within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A software-defined radio chip comprising:
   a reconfigurable hardware programmable logic circuit configured at least to function as a digital front end for converting digital frequency samples to digital baseband samples; and
   a digital back end for processing the digital baseband samples to provide a consumable content,
   wherein the reconfigurable hardware programmable logic circuit includes a secure cryptographic device for providing a root of trust having a particular key from a key ladder scheme.

2. The software-defined radio chip according to claim 1, wherein the digital back end comprises a digital signal processing module.

3. The software-defined radio chip according to claim 1, wherein the reconfigurable hardware programmable logic circuit is further configured to function as the digital back end.

4. The software-defined radio chip according to claim 1, further comprising an analogue front end at least for converting a radio frequency signal to an analogue intermediate frequency signal and for converting the analogue intermediate frequency signal to provide the digital intermediate frequency samples.

5. A system comprising:
   a software-defined radio chip according to claim 1;
   an antenna for receiving the radio frequency signal for the radio frequency signal; and
   a server for sending information to and/or receiving information from the software-defined radio chip, the server being configured to authenticate at least part of the information coming from the software-defined radio chip and the software-defined radio chip being configured to authenticate at least part of the information coming from the server.

6. A software-defined radio chip comprising:
   a digital front end for converting digital intermediate frequency samples to digital baseband samples;
   a digital back end for processing the digital baseband samples to provide a consumable content; and
   a reconfigurable hardware programmable logic circuit configured at least to function as the digital front end;
   wherein the reconfigurable hardware programmable logic circuit includes a secure cryptographic device for providing a root of trust having a particular key from a key ladder scheme, wherein the secure cryptographic device includes a configuration module having a decrypt and verify module for decrypting and authenticating and/or verifying the integrity of configuration data; and a processing module for processing at least a portion of the configuration data;
   at least one cryptographic module accessible via at least one input/output module; and
   an interconnection network passing between modules of the secure cryptographic device;
   wherein the configuration module is arranged to configure at least one of the input/output module or cryptographic modules and/or at least a subset of the interconnect network.

7. The software-defined radio chip according to claim 6, wherein the processing module comprises a one-way function that is operable on the configuration data to provide processed configuration data.

8. The software-defined radio chip according to claim 6, wherein the system is configured to perform the processing after the decryption and/or verification.

9. The software-defined radio chip according to claim 6, wherein the system is configured to perform the processing before the decryption and/or the verification.

10. The software-defined radio chip according to claim 6, in which it is arranged for the processed configuration data to be used to configure at least one of the input/output module or the cryptographic module.

11. The software-defined radio chip according to claim 6, wherein the input/output module or the cryptographic module comprises at least one of: a substitution box module, a substitution table module, a bit permutation module, a byte permutation module, or a matrix multiplication module.

12. The software-defined radio chip according to claim 11, the input/output module or the cryptographic module further comprising a hardener for a true random number generator or a physically un-clonable function, and/or a flexible state-machine, or a portion of the interconnection network.

13. A method for programming a software-defined radio chip having a reconfigurable hardware programmable logic circuit, the method comprising:
   loading information onto the reconfigurable hardware programmable logic circuit, configured to function as a digital front end for converting digital frequency samples to digital baseband samples, after authenticating and decrypting the information using a root of trust in the software-defined radio chip having a key from a key ladder derived from a particular key.

14. The method according to claim 13, further comprising:
   loading configuration data onto the reconfigurable hardware programmable logic circuit;
   processing at least a portion of the configuration data via a one-way function to form processed configuration data; and
   configuring at least one configurable module of the reconfigurable hardware programmable logic circuit using the processed configuration data.

15. The method according to claim 14, further comprising deciphering the configuration data using either an asymmetric key or a symmetric key.

16. The method according to claim 14, wherein the configuring step comprises:
   initializing the reconfigurable hardware programmable logic circuit;
   configuring a configurable module of the reconfigurable hardware programmable logic circuit; and
   configuring an interconnection between modules of the reconfigurable hardware programmable logic circuit wherein the modules may be configurable or non-configurable.

17. The method according to claim 14, wherein the loading step comprises verifying the authenticity and/or integrity of the configuration data using either an asymmetric key or a symmetric key.

18. The method according to claim 14, further comprising deciphering the configuration data using either an asymmetric key or a symmetric key, wherein the loading step comprises verifying the authenticity and/or integrity of the configuration data using either the asymmetric key or the symmetric key.

19. The method according to claim 13, further comprising processing the digital baseband samples using a digital back end in the software-defined radio chip to provide a consumable content.

* * * * *